United States Patent [19]

Busignies et al.

[11] Patent Number: 4,721,961
[45] Date of Patent: Jan. 26, 1988

[54] SUBMARINE DETECTION SYSTEM

[75] Inventors: Henri G. Busignies, Montclair; Louis A. Derosa, Upper Montclair, both of N.J.

[73] Assignee: ITT Avionics, Nutley, N.J.

[21] Appl. No.: 851,934

[22] Filed: Nov. 3, 1959

[51] Int. Cl.[4] .............................................. G01S 3/02
[52] U.S. Cl. ..................................... 342/458; 342/459; 342/453; 342/22
[58] Field of Search ................... 343/112; 342/13, 22, 342/458, 459, 460, 453; 367/128

[56] References Cited

U.S. PATENT DOCUMENTS 1,828,531  10/1931  Gage .
2,422,107   6/1947  Luck .

Primary Examiner—Theodore M. Blum
Attorney, Agent, or Firm—Robert A. Walsh; Thomas N. Twomey; Mary C. Werner

[57] ABSTRACT

This invention relates to a system for detecting submerged objects by receiving an incident indication of electromagnetic energy and also the reflection of said energy caused by the presence of a submerged object and to comapre the field strength of the incident radiation with the field strength of the reflected radiation to determine the relation therebetween, the relation being a measure of the object location.

16 Claims, 23 Drawing Figures

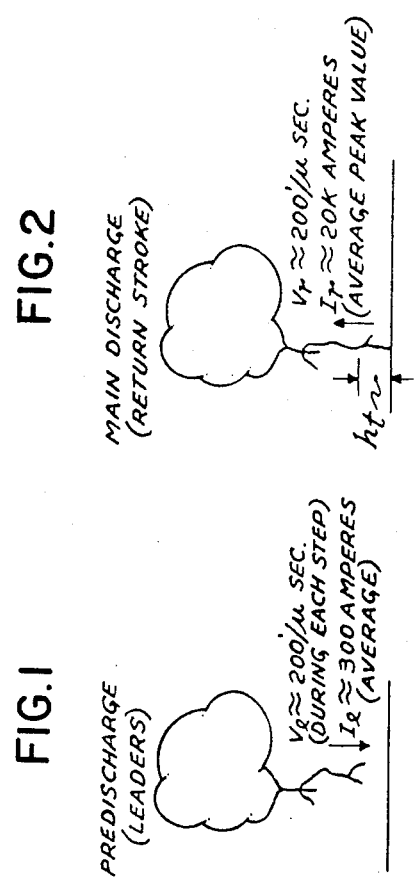
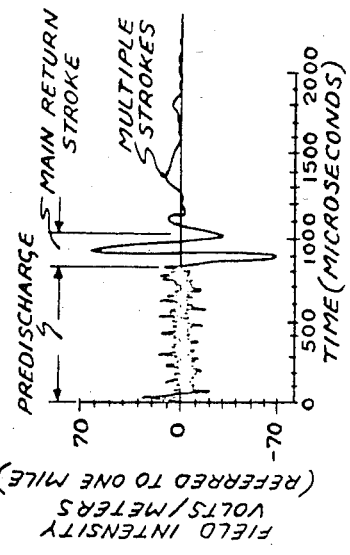
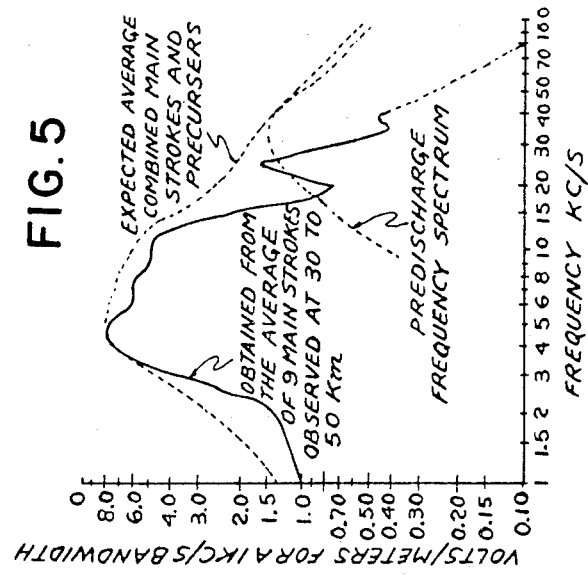
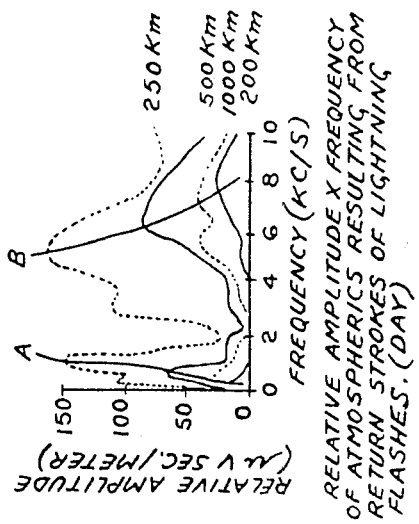

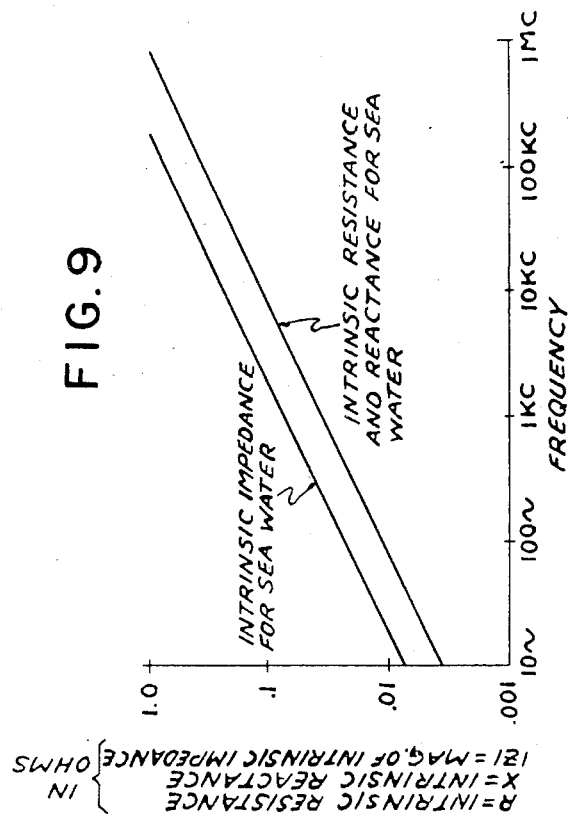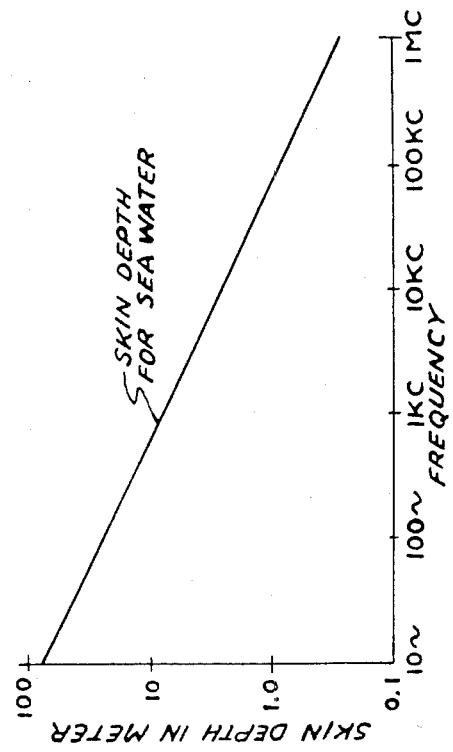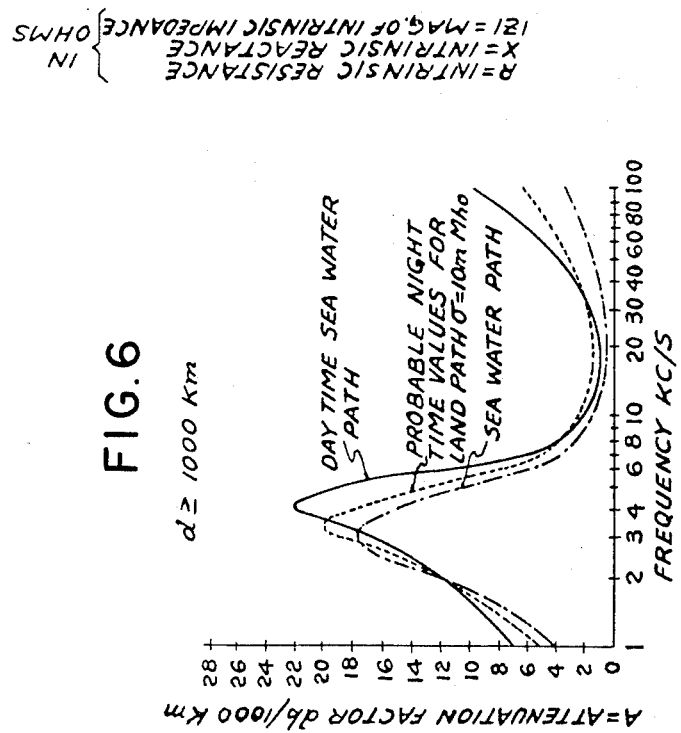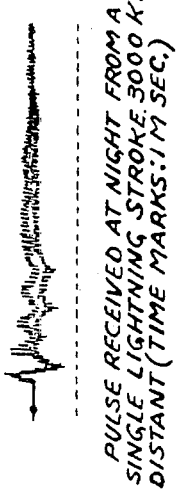

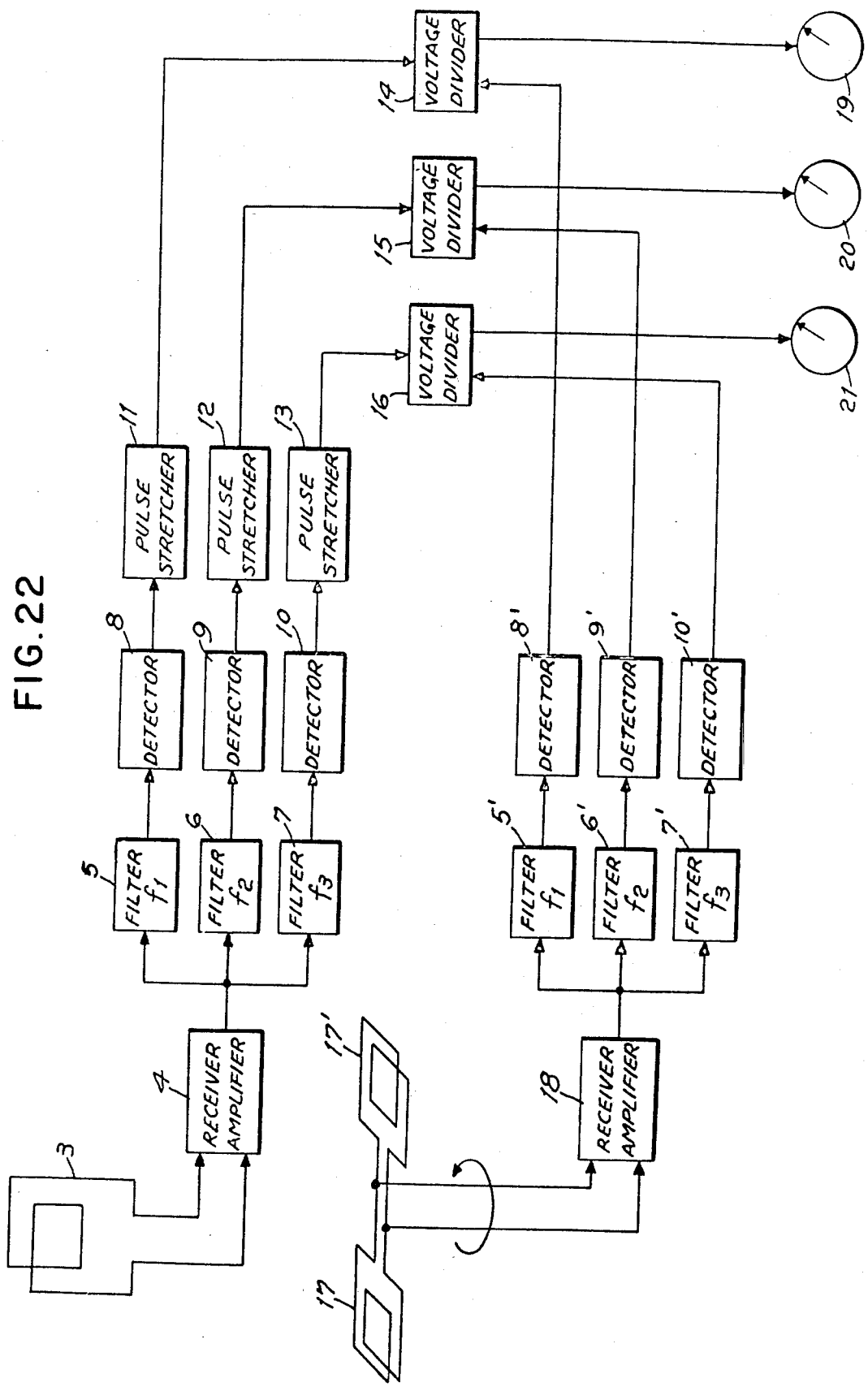

SUBMARINE DETECTION SYSTEM

This invention relates to a detection system for submerged objects and more particularly to a system for detecting the location of submerged objects by means of radiated electromagnetic energy regardless of the source of said energy.

In the copending application of Louis A. deRosa filed July 20, 1959, Ser. No. 829,181, there is disclosed a system for the detection of the presence and depth of submerged objects by utilizing the electromagnetic radiation of lightning flashes and other atmospheric disturbances, of which the low frequency signals travel long distances from the source of the disturbance with considerably less attenuation than the high and very high frequency signals.

The importance and the gravity of the problem of detecting submarines cannot be over emphasized. In the last two world wars, the democracies were close to the verge of defeat because of the relentless ferocity of the submarine warfare waged by the enemy and only by Herculean efforts was defeat averted. Today it is more important than ever before because of the new found capability of submarines equipped with nuclear propulsion machinery to cruise indefinitely and their ability to carry and fire missiles having ranges of several thousand miles.

Sonar has been employed for subsurface object detection and observers flying overhead can visually detect underwater objects. These means, however, are limited in range and depth. Sonar capability is limited by sound's distortion as it strikes the temperature ducts of the sea and by its limited capability for discrimination. There are limits to visual observation, such as, unfavorable weather conditions, and sonar devices often detect the presence of schools of fish and other inoffensive objects which are mistaken for submarines. These detection devices are also relatively expensive and have limited range. Radar cannot be used successfully because high frequency signals are rapidly attenuated in sea water. Low frequency radio signals within the audio range suffer much less attenuation but to transmit such signals requires tremendously long antennas and enormous power. For example, to transmit radio signals of the frequency of 1,000 cps would require an antenna approximately 93 miles long, the half wavelength of the signal at that frequency. It is obvious that it is impossible to build transmitters to operate at such low frequencies but, at the same time, there is great necessity for such a system.

It is an object of this invention, therefore, to provide a system for detecting the location of submerged objects, such as submarines, at distances greater than are possible by detection systems heretofore known.

It is a further object to provide a submarine detection system capable of utilizing the electromagnetic radiation of low frequencies regardless of the source of such radiation.

A feature of this invention is the provision of means adapted to receive an incident indication of electromagnetic energy and also the reflection of said radiation caused by the presence of an object submerged in a medium having radiation transmission characteristics substantially different from that of the atmosphere. Means are provided to compare the field strength of the incident radiation with the field strength of the reflected radiation to determine the relation therebetween, said relation being a measured corresponding substantially to the location of said object.

These and other features and objects of this invention will become more apparent by reference to the following description taken on conjunction with the accompanying drawings, in which:

FIGS. 1 and 2 are illustrations of the lightning discharge generation;

FIG. 3 is the waveform of the effective radiated electric field of a lightning discharge;

FIG. 4 is a graph showing the relative amplitude and frequency distribution of the components of a lightning flash in the low frequency spectrum;

FIG. 5 is the frequency spectrum of the radiation component at a distance of 1 mile from the source of the discharge;

FIG. 6 is a graph of the attenuation factor versus frequency of the lightning discharge;

FIG. 7 shows the pulsations of a single lightning stroke;

FIG. 9 is a graph showing the variation of the intrinsic impedance of sea water with the frequency;

FIG. 10 shows the variation of skin depth with frequency in sea water;

FIG. 22 is a block diagram of the embodiment of the detection system of this invention.

Figure 19:
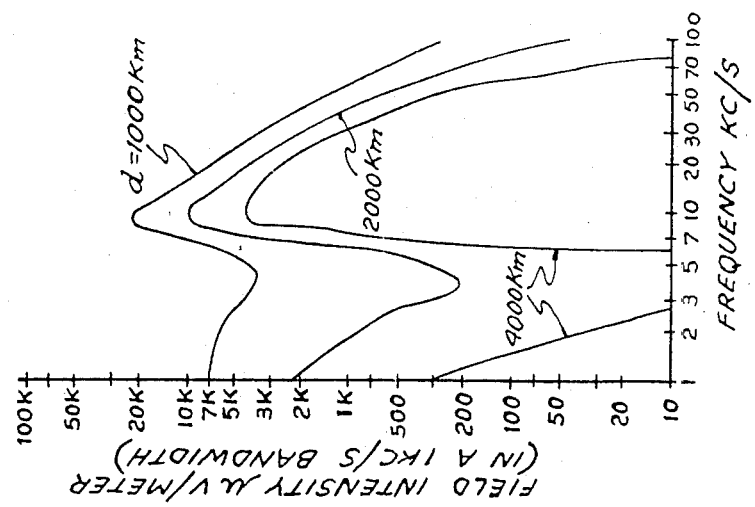
FIG. 19 is a graph showing the frequency spectrum of average lightning discharge source.

Radio noise falls into several categories, such as atmospheric, galactic, solar, precipitation, thermal and man made. Below about 30 megacycles and particularly in vlf (very low frequency) range, atmospheric noise is usually the most important of these types of noise. It is now clear that the main factors influencing the waveform of an atmospheric are the distance of the source from the observing station and the condition of the lower ionosphere. Lightning is the most effective terrestrial source of radiation in the vlf range. The exact mechanism of lightning discharge is very complex. It has been shown, however, that the discharge is initiated by a weakly ionized, slow moving pilot streamer which in general advances from the clouds toward the ground in spurts of 30 to 200 feet with velocities in the order of 1 to 2 feet per microsecond. This pilot is followed by a highly ionized leader as shown in FIG. 1 which travels at approximately 200 feet per microsecond producing a current pulse in the order of 300 amperes whose length is approximately one microsecond. The pilot again moves forward and the process repeats itself every 25 to 100 microseconds. These short pulses and the branch leaders repeated at rates of from 10 to 40 kc radiate energy during this period known as the predischarge, which has a total length in the order of 1 millisecond. This length obtained by employing an average height of 5,000 feet is in good agreement with observations of the electric field. Once the leader reaches the ground as shown in FIG. 2, the main or return stroke with average peak current values of 20 kiloamperes starts upward at a velocity in the order of 200 feet/microsecond. A typical recording of the electric field variation at a distance of 20 km from the source is shown (referred in amplitude only to a distance of one mile) in FIG. 3 where the relative shapes and amplitudes of the predischarge and main stroke portions are readily apparent. Once the main stroke is complete, it may be followed by one or more multiple strokes which in general follow the original ionized path and will probably have a considerably different form of leader stroke. Since over half of the cloud-to-ground discharges have two or more strokes, this factor must be considered in determining the average relative amount of energy radiated from the predischarge and main stroke as a function of frequency. FIG. 5 shows the frequency spectrum of the energy contained in the predischarge strokes and the main discharge strokes and the average of both the main strokes and the predischarge strokes. It should be noted that energy from the predischarge is radiated over approximately 1 millisecond, while the lower frequency components of the main discharge are radiated in 100 to 200 microseconds. It has been found that a considerable amount of high frequency energy is present in the predischarge portion while the main discharge portion contains energy of the lower frequency spectrum. In FIG. 4 is shown the relative amplitude of the frequency components of lightning discharges as received at four different distances from the source. As is to be expected, the amplitude decreases as the distance of propagation increases. The marked drop in the curves in the region 2 kc/s is indicative of selective attenuation of these components on an increasing scale with distance.

Recent studies have shown that the vertical electric field propagated at great distances from the source can be represented by an expression having the form $$E_d \simeq \frac{E_o \times 0.4 \times 10^{-(Ad/2 \times 10^4)}}{\sqrt{d} \cdot \sqrt{f}} \quad 1000 \leq d \leq 8000,$$

where $E_d$ is the vertical electric field at a distance d from the source, d is this distance in kilometers, $E_o$ is the effective radiated field at 1 mile from the source usually expressed in v/m, f is the frequency in kc, and A is the attenuation factor in db/1000 km. The factor A is presented in FIG. 6. The sea water curve indicates a decided preference for frequencies in the order of 15 to 20 kc. It is also notable that frequencies within the ranges of 2 to approximately 6 kc/s show the greatest attenuation. There are other characteristics of the frequency component generated by the lightning flash. Under typical night conditions, a received lightning pulse has a distinct tonal quality, or whistle. The pulse is usually received as a long train of oscillations with gradually increasing period; the longest period of oscillation is always in the neighborhood of 1700 cycles. The duration of the received pulse may be as long as 100 msec although the originating pulse was less than 0.1 msec. During the day, the received pulse is typically of much shorter duration, of the order of 5 msec., and hence exhibits no tonal quality. The cut-off frequency of 1700 cycles is by no means the lower limit of the spectrum. The atmospheric pulse also exhibits considerable amplitude in the frequency range below a few hundred cycles. FIG. 7 shows a pulse typical of those received at night; the initial portion is in the vicinity of 5 kc with quasi-periodic components diminishing to the cut-off frequency of 1700 cycles; superimposed on the quasi-periodic components are seen considerably lower frequency components in the vicinity of 10 to 600 cycles.

Figure 8:
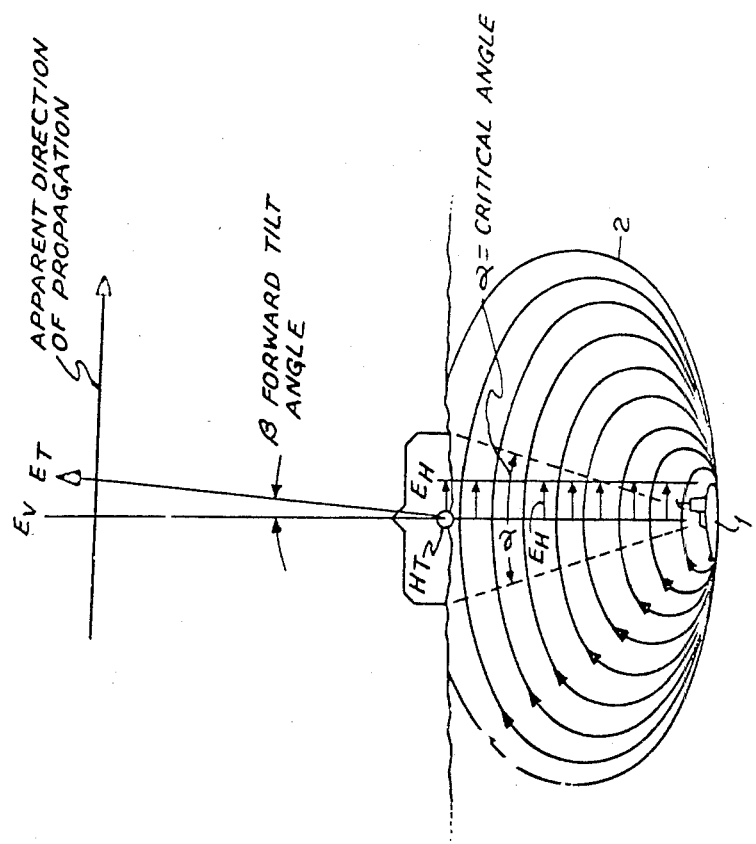
FIG. 8 is the diagram showing the incident field and the reflected field from a submerged object.

Nearly all high-current lightning strokes are essentially vertical between cloud and ground. Consequently, the radiated electric field will propagate with vertical polarization. Reception of this field is readily achieved with several possible antenna types of which the following are three examples: (a) a conventional vertically polarized antenna consisting of a horizontal wire elevated above the ground; (b) a loop antenna in a vertical plane; and (c) a ground dipole. The nature of a plane linearly polarized wave traveling at slight angle to a plane boundary, in this case sea water, is shown in FIG. 8. A propagating vertical electric field possesses a slight forward tilt in the vicinity of the earth's surface because of the partial conductivity of the earth at the frequencies in the audio range. Plane wave analysis indicates that for this mode of propagation alone, that is for the atmospheric noise, ratios of incident energy to "disturbing" energy or reflected energy will be on the order of 85 db at 100 cps and 94 db at 1 kc for reflecting surfaces in 25 meters of sea water. Consider a plane wave incident on the surface of the water and assume simple harmonic time variation of the electric and magnetic field intensities. A fraction of the incident energy will be transmitted into the water and the remainder will be reflected. Now suppose that the sea bottom is a perfect plane reflector so that when the wave reaches bottom, it is completely reflected back onto the surface. At the sea-to-air boundary, a fraction of the incident energy will be transmitted into the air and the remainder will be reflected downward. Assuming the E-vector in the plane of incidence (plane of the paper) then at the boundary, the normal to the wave is tilted slightly because as stated above, the water is a partial conductor. This tilt produces a tangential component of electric field intensity which accounts for energy flow into the water. If we assume essentially vertically polarized waves, then angles of incidence comparable to the tilt angle assume importance because these will prevail in general. $E_t$ is the total E vector, $E_v$ is the vertical component of $E_t$ and $E_h$ is the horizontal component of $E_t$ due to the forward tilt angle B. It is this horizontal component, $E_h$, which penetrates into the water and will strike the submerged object 1. When this occurs, the submerged object 1 acts as a radiator or antenna and propagates reflected electromagnetic waves. The e vector lines of the spreading reflected electromagnetic wave are approximately in the shape of ellipses 2 terminating at the submerged object in the same fashion as radiations from any antenna. There is a critical angle $\alpha$ within which area some power of the reflected wave will penetrate and propagate in the air space; but most of the power will be reflected back into the water. The reflected wave that penetrates into the air causes perturbations of the electromagnetic field of the incident wave and these perturbations are amenable to detection above the surface of the water at reasonable distances from the source of the disturbance, i.e., the submerged object. Although the reflected electromagnetic wave ellipses 2 are shown in one plane, it is to be understood that the propagation is three dimensional, with the electromagnetic waves propagating outwardly from the submerged object 1 in all directions. Therefore the solid radiation pattern would be in the form of an oblate sphere.

Figure 13:
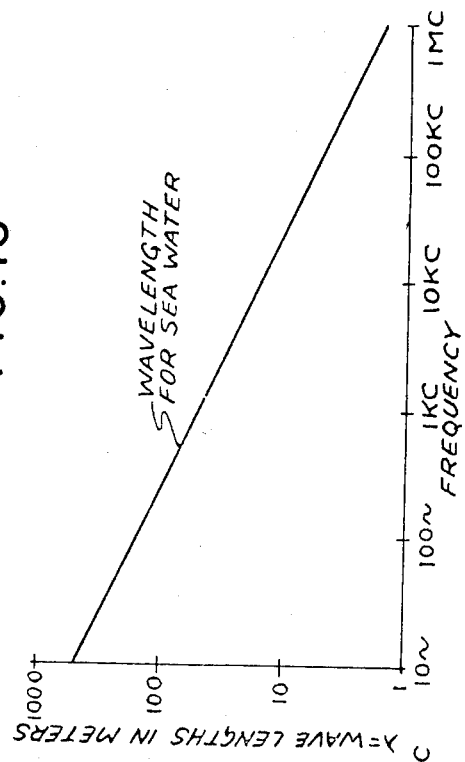
FIG. 13 is a graph showing the variation of wavelength in sea water with frequency.
Figure 14:
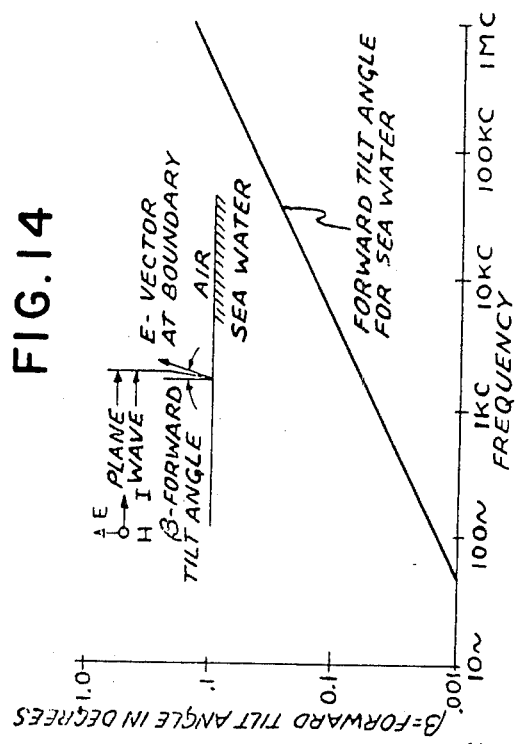
FIG. 14 is a graph showing the variation of tilt angle of an electromagnetic plane wave traveling over a plane boundary.
Figure 11:
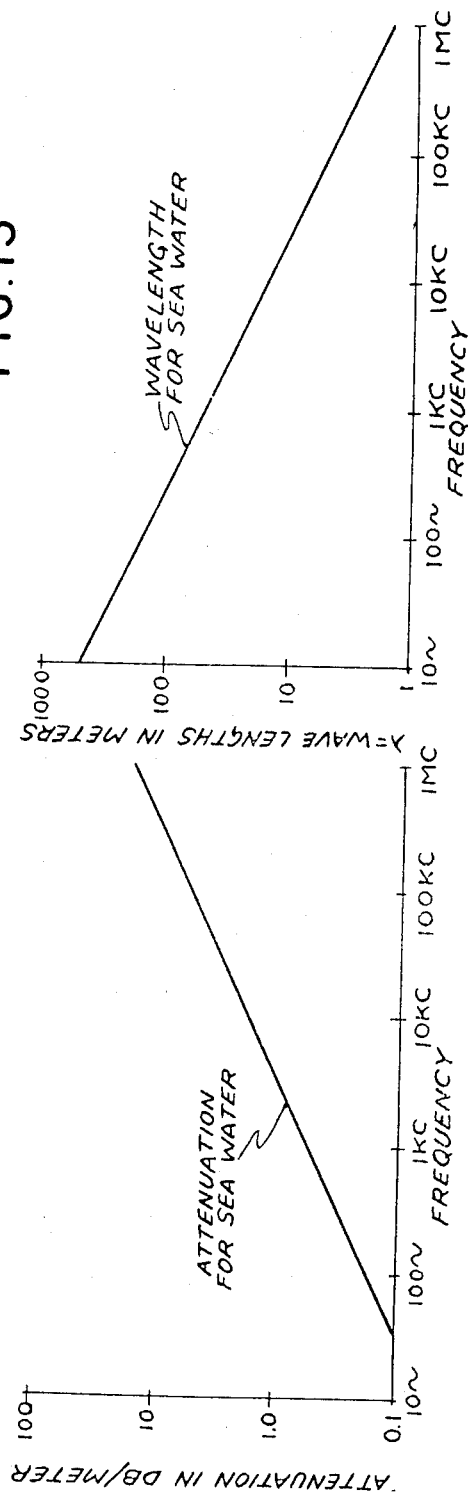
FIG. 11 is a graph showing variation of attenuation of sea water with frequency.
Figure 12:
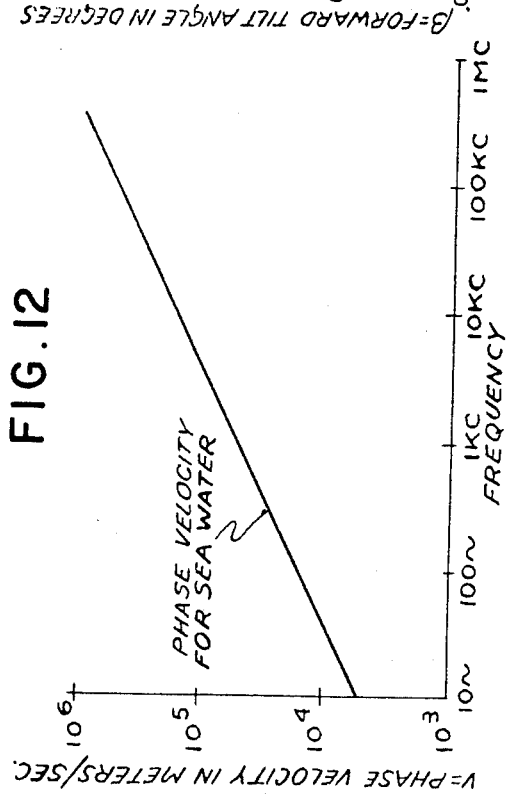
FIG. 12 is a graph showing the variation of phase velocity of a signal in sea water with frequency.
Figure 15:
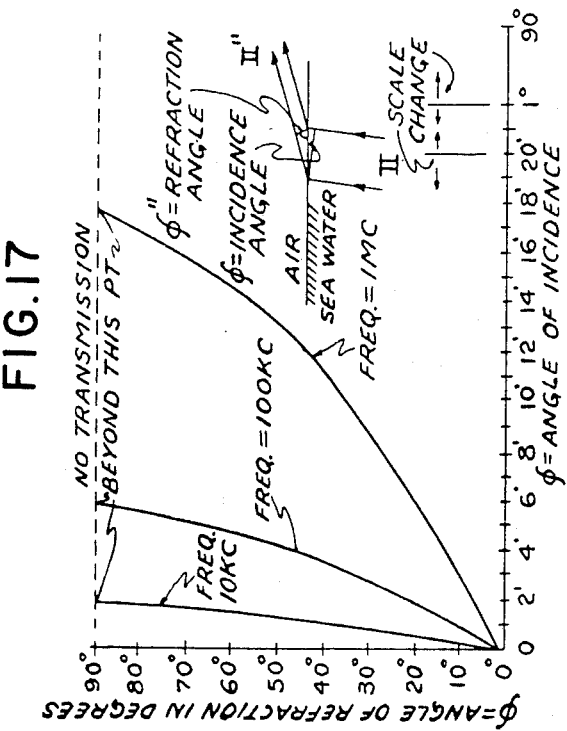
FIG. 15 is a graph showing the variation of refraction angle with frequency.
Figure 16:
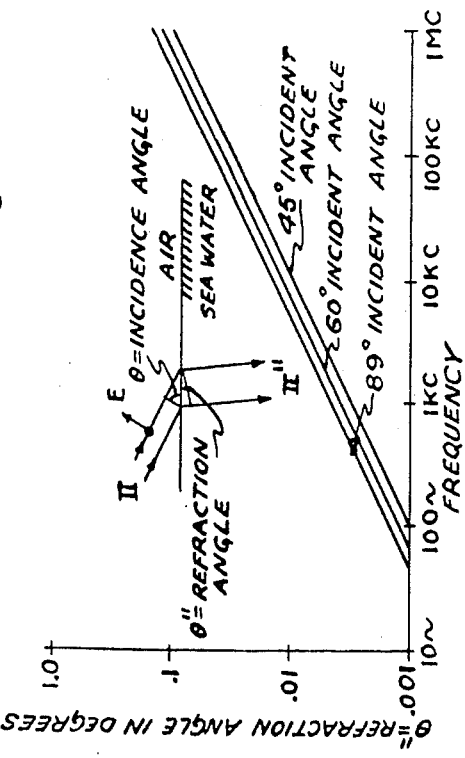
FIG. 16 is a graph showing the variation of attenuation of air-to-sea boundary with frequency.

It will be shown that the incident wave transmitted into water and reflected back will return with sufficient signal strength that a sensitive receiver properly oriented will be capable of receiving in the air space above the submerged reflecting object after the reflected signals are transmitted through the water and into the air. It is instructive to examine the characteristics of a wave which penetrates the sea-to-air boundary, travels to a submerged object, is reflected and finally emerges into the air. The values used for the constant of the three media, air, sea water, and a plane reflector, are those given in most texts on electromagnetics. FIG. 9 is a plot of a magnitude of the intrinsic impedance for sea water and as expected shows that with increasing frequency the intrinsic impedance linearly increases. FIG. 10 is a plot of skin depth as a function of frequency. "Skin depth" is the depth below the surface of a conductor at which the current density has been reduced to 1/e times its value at the surface of the conductor where e=2.718. The skin depth is given by the expression $$\delta = \frac{1}{\sqrt{\pi f \mu \gamma}}$$

where $\delta$ equals the depth in meters, f is the frequency in cps, $\mu$ is the permeability in henries/meter and $\gamma$ equals the conductivity in mhos/meter. FIG. 11 is the attenuation of sea water in db per meter as a function of frequency. Here again, as is to be expected, the attenuation increases with increasing frequencies. FIG. 12 is a plot of phase velocity or velocity of propagation, as a function of frequency. Whereas in air this velocity is constant, in sea water it increases with frequency and results in frequency distortion of the waves. This dispersive or dissipative property may be used to advantage. FIG. 13 is a plot of wavelength as a function of frequency. Whereas in air the wavelength varies inversely as the first power of frequency; in sea water in varies inversely as the half power. This shows that the wave in sea water is greatly compressed as the velocity of the wave is slowed up by the resistance of the sea water. The variation of the forward tilt angle of a plane linearly polarized wave with frequency is shown in FIG. 14. FIG. 15 is a plot of the angle of refraction $\phi''$ as a function of frequency for three values of angle of incidence $\theta$ for an oncoming wave front. For an incident plane linearly-polarized wave with the E vector in the plane of incidence, FIG. 15 shows that the refraction angle is extremely small. Therefore, the wave travels almost vertically downward and within limits the direction is independent of the angle of incidence. FIG. 16 shows the variation of the transmitted power density from air to sea at the boundary as a function of frequency with the angle of incidence varying between zero and 89.9 degrees. This curve shows that for increasing frequency the boundary becomes more penetrable. For example, at 10 kc the boundary loss is approximately 30 db; at 1 megacycle it is approximately 20 db.

Figure 17:
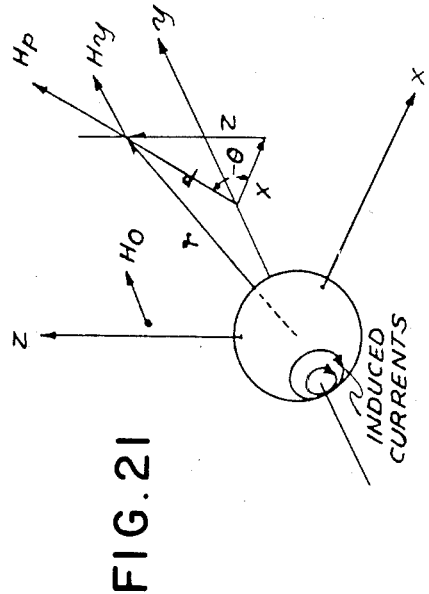
FIG. 17 is a graph showing the angle of refraction as a function of the angle of incidence.
Figure 20:
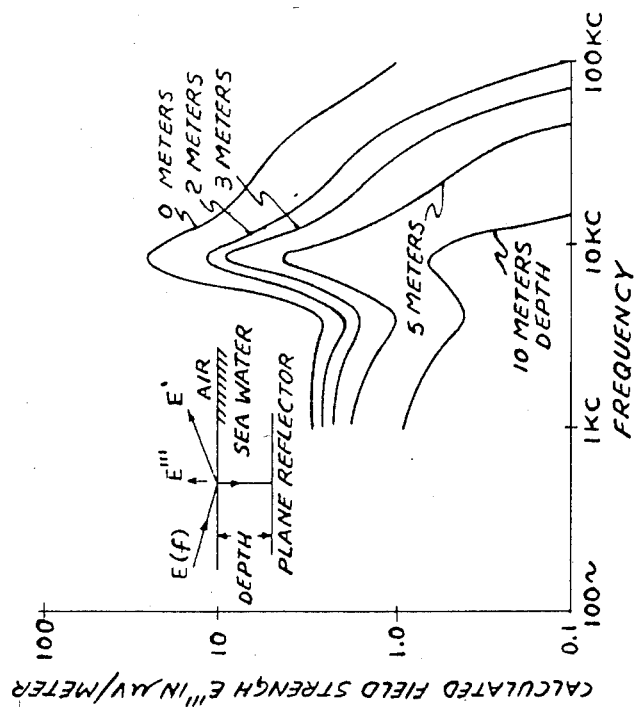
FIG. 20 is a graph showing calculated field strength.
Figure 18:
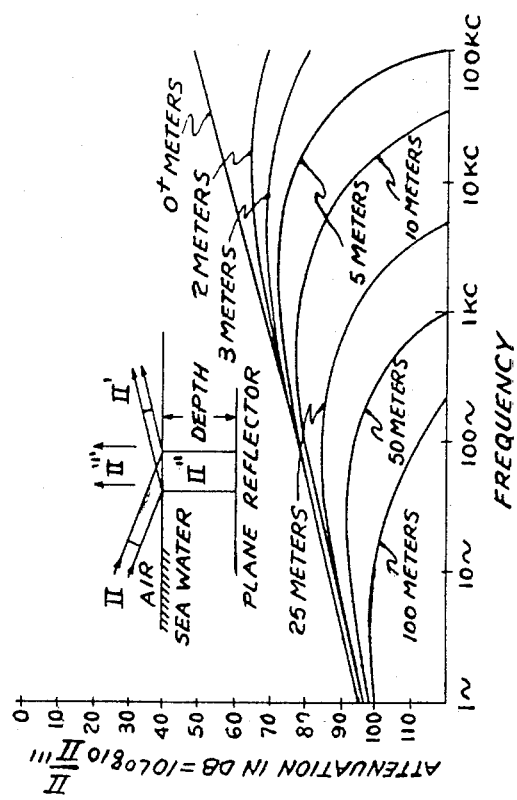
FIG. 18 is a graph showing the variation of attenuation with frequency and depth.

FIG. 17 is a plot of angle of refraction as a function of incidence angle as we go from the sea water medium into the air medium. Again, the E vector is assumed in the plane of incidence. For 100 kc this plot shows that the wave is completely reflected for angles of incidence exceeding 6 minutes. The corresponding angle for 10 kc is 2 minutes. The nature of the incident wave considered here is the same as that of a wave which penetrates the air-to-sea boundary, travels to the sea bottom and is reflected by a perfect and parallel plane reflector, and is then incident on the sea-to-air boundary. The implication here is that, in the plane wave case, the amount of energy transmitted back out of the water will depend largely on the orientation of the reflecting surface in the water. FIG. 18 is a plot of the attenuation between the original incident wave and the wave which finally emerges from the water, after the trip through the air-to-sea boundary, down to bottom, back up and through the sea-to-air boundary. The attenuation in db is plotted as a function of frequency for several different depths of the plane reflector. It has been assumed that the wave when reflected by the plane reflector returns to the surface vertically so that we have normal incidence at the sea-to-air boundary. These curves show that for a given depth there exists a frequency at which the attenuation is a minimum. Also, the boundary loss is more significant for low frequencies; the depth loss is more significant for high frequencies. FIG. 19 illustrates the calculated frequency spectrum of average electrical storm noise. The noise spectrum is given in terms of the electric field intensity for a one kc band-width due to an average lightning discharge source 1000 kilometers distance and more and over the day time sea water path. FIG. 20 is a plot which combines the results of FIG. 18 with FIG. 19 to give the resulting field intensity as the function of frequency after the wave has completed the trip shown in the diagram. The curves show generally that the maximum field intensity at 8500 cps is preserved, but at greater depth its peak is less pronounced. The data used in this treatment assumes plane waves and plane reflection and does not provide the true value of field strength. In a plane wave treatment and utilizing plane reflection, the field strength does not reflect the reactive power as well as reradiated power and reflected power which will provide energy levels that are higher than shown in the graph of FIG. 20. Since a submerged body has finite dimensions and not the infinite dimensions utilized for calculations with the plane reflector, the field strength will be higher.

Figure 21:
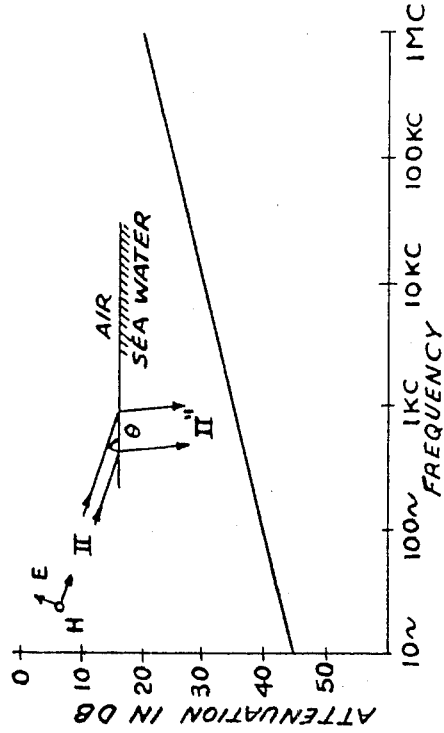
FIG. 21 is a diagram illustrating the reflected fields of a submerged sphere.

When the horizontal component $E_h$ of the incident electromagnetic wave penetrates into the water, as described above, and strikes a submerged metallic object, such as a submarine, the submerged object acts as a radiator or antenna and propagates reflected electromagnetic waves. There is reason to believe that the submerged object can be approximated by a distribution of horizontal electric dipoles. The magnetic field in the neighborhood of a submerged horizontal electric dipole, or the near field strength in air, varies approximately as the inverse cube of distance, and for representative conditions, assuming one ampere of dipole current, the threshold of detectability is at about 400 meters. It is also known that, for the actual problem of a submarine excited by an incident wave, the field configuration in air is such that separation of incident and secondary field can be obtained under certain conditions. The plane wave incident on the submarine from above gives rise to a scattered wave which spreads out from the submarine in all directions. If the wavelength in sea water is small compared with dimensions of the submarine (as for the case of frequencies greater than 100 kc), approximately half of this scattered wave spreads out more or less uniformly and the other half is concentrated above the submarine. If the wavelength is large compared with the dimensions of the submarine as for the case of frequencies less than 100 cps, then all the scattered wave is sent out uniformly in all directions. The primary path of field propagation from an excited submerged submarine occurs through the air above the interface, that is, the sea-to-air boundary, and the field along the direct path through the water is negligible except for very small distances from the source. It has also been shown that the field in the air is determined solely by the horizontal currents in the radiating source and the effects of vertical currents in the source and of currents in the conducting medium may be neglected. Furthermore, because of continuity of the magnetic field across the sea-air boundary, the field just below the surface is the same as that just above the surface. The total electromagnetic field in the air above the excited submerged submarine is the vector sum of the primary and the secondary fields. The primary field is the field of the incident wave front. The secondary field is composed of the scattered or reflected waves from the submarine and in addition if the object is excited, then the radiations that are caused by the excitation of the object. Referring to FIG. 21, assume the case where the applied field is a plane wave, a spherical submarine of radius a with constants $\sigma_c$, $\mu_c$, $\epsilon_c$, immersed in sea water with constants $\sigma_s$, $\mu_s$, $\epsilon_s$, and an applied magnetic field $H_o$ parallel to the y axis. $\sigma$ is the conductivity of the medium, $\mu$ the magnetic permeability and $\epsilon$ is the dielectric constant.

For the case when $\sigma_c >> \sigma_s$, the secondary field is completely specified by the two components $$H_y = -\frac{3}{2} a^3 H_o \frac{1}{(M \neq iN)\left(-\frac{1}{r^3} \neq \frac{3y^2}{r^4}\right)}$$

$$H_\rho = \frac{3}{2} a^3 H_o (M \neq iN) \frac{3y\rho}{r^5}$$

where
$H_o$ = applied field, amperes/meter at center of sphere.
a = radius of sphere, meters
x, y, z, $\rho$ in meters $$r = \sqrt{y^2 \neq \rho^2}$$

$$M \neq iN = \left[\frac{1}{K^2} \neq \frac{1}{3} - \frac{\cosh K}{K \sinh K}\right]$$

$K = a[i\sigma_c\mu_c\omega - \epsilon_c\mu_c\omega^2]^{\frac{1}{2}}$ $\omega = 2\pi f$, f in cps Using these expressions, the magnetic field strength for the plane z=d can be determined in order to evaluate the secondary field on the air-sea boundary. At the point x=0, y=0, z=d, the field components are
$H_\rho = 0$ $$H_y \approx \frac{a^3 H_o}{2d^3}$$

If $H_s$ is the magnitude of the applied magnetic field at the sea surface, we have $$H_o = H_s \epsilon^{-0.00398\sqrt{f}\, d}$$

Hence the secondary field component $H_y$ at x=0, y=0, z=d written as follows:

$$H_o \approx \frac{a^3}{2d^3} H_s \epsilon^{-0.00398\sqrt{f}\, d}$$

It follows that the attenuation between incident and secondary field is
Atten:

$$db = 20 \, lg_{10}\frac{Hs}{Hy} \approx 20 \, lg_{10}\frac{2d^3}{a^3} \epsilon^{0.00398\sqrt{f}\, d}$$

At a frequency of 1000 cps, a depth of 10 meters, and a submarine radius of 5 meters, the attenuation in the magnetic field intensity is 35 db.

At a great distance from the source of propagation of the electromagnetic waves, the field in the case of a loop antenna in a nondissipative medium, such as air, is defined by the following expressions:

$$H_\theta = -\frac{\pi \delta I e^{-iBr} \sin\theta}{\lambda 2_r}$$

$E_{104} = -\eta H_\theta, \ H_r = 0$ where
H = the magnetic field vector
E = the electric field vector
S = the area of the loop
I = current in the loop
r = the distance from the loop
B = $(2\pi/\lambda)$
$\eta$ = the intrinsic impedance of the medium and for air = $120\pi$ ohm the ratio $(E\psi/H_\theta) = -\eta$ and is constant for all frequencies.

The near field of a loop is defined by the following equations:

$$H_\theta = \frac{SI \sin\theta}{4\pi r^3} e^{-iBr}$$

$$E_\psi = -\frac{i\omega\mu SI \sin\theta}{4\pi r^2} e^{-iBr}$$

The radial vector $H_r$ of the magnetic field can be disregarded. The ratio of the electric to the magnetic fields of the loop for the near field case is then $(E/H) = -i\omega\mu r$ That is, the ratio decreases the closer the field is approached.

The far field of a dipole in a nondissipative medium is defined by the following expressions:

$$H_\psi = \frac{iIl}{2\lambda r} e^{-iBr} \sin\theta$$

$$E_\theta = \frac{i\eta Il}{2\lambda r} e^{-iBr} \sin\theta$$

$E_r$ can be disregarded.
Where $l$ = the length of the dipole
Therefore, the ratio
$(E/H) = \eta$
For the near field of the dipole $$E_\theta = \frac{-i\eta Il}{2\lambda B^2 r^3} e^{-iBr} \sin\theta$$

$$H_\psi = \frac{Il}{2\lambda Br^2} e^{-lBr} \sin\theta$$

and $\dfrac{E}{H} = \dfrac{-i\eta}{Br} = -i\dfrac{1}{\omega\epsilon\gamma}$

Therefore, in the case of the dipole, as the near field is approached, the ratio (E/H) increases.

It has been shown that for the far field in the case of both the loop and the dipole, the ratio (E/H) is independent of frequency and is a constant. For the near field in both cases, the ratio is a function of the frequency and the distance from the field; for decreasing r in the dipole case the ratio increases whereas in the loop case, the ratio decreases. The relation of the far and near fields can be utilized to determine the location of a submerged object.

It has been shown that for submerged metallic objects there is a sizable component of a reflected or secondary field only 35 db below the incident field. This invention discloses a means for the detection of such objects.

With reference to FIG. 22, there is shown one embodiment of the detection system of this invention. A loop antenna 3 vertically polarized to receive the incident electromagnetic radiations of atmospherics is coupled to a receiver and amplifier 4 adapted to receive the frequencies of interest, that is, the frequencies in the audio range of approximately 250 to 15,000 cps. The output of the receiver-amplifier 4 is coupled to a plurality of filters 5, 6, 7 and separated into signals having the frequencies $f_1$, $f_2$, and $f_3$. The output of the filters 5, 6 and 7 are respectively coupled to detectors 8, 9, and 10 to smooth out the voltages and provide dc voltages that are applied to pulse stretchers 11, 12 and 13 or any similar device that will store the incident signals for a predetermined period of time so that the incident signals will be present at the same time that the reflected signals are received. The storage time for each frequency is determined by the velocity of propagation of each frequency signal in sea water as hereinabove described. The outputs of the pulse stretchers 11, 12 and 13 are then applied to one input respectively of voltage dividers 14, 15 and 16. An example of such a voltage divider is described on pages 48-53 of Volume 21 of the MIT Radiation Laboratory Series.

A pair of loop antennas 17 and 17' connected together to provide a figure of eight directional pattern and horizontally polarized to pick up the reflected waves from submerged objects to locate the direction of signal arrival are connected to the input of a receiver-amplifier 18 similar to receiver-amplifier 4. The antennas 17 and 17' may be located at opposite ends of the craft carrying them or they may be mounted on a shaft for rotation in the horizontal plane. More accurate direction finding is thereby achieved. The output of the receiver-amplifier 18 is applied to filters 5', 6' and 7', similar to the filters 5, 6 and 7. The outputs of the filters 5', 6', and 7' are correspondingly applied to detectors 8', 9', and 10' and after the voltage smoothing therein are applied to voltage dividers 14, 15 and 16. The function of the voltage dividers is to obtain the ratio of the field strength of the incident wave to the field strength of the relfected wave. The power of the incident wave is $$P_i = E_i \times H_i$$

and the power of the reflected wave is $$P_r = E_r \times H_r$$

The ratio between the two signal powers is $$db = 10 \log \frac{P_i}{P_r} = \frac{V_i^2}{z} = 20 \log \frac{V_i}{V_r}$$

$$\frac{V_r^2}{z}$$

where $V_i$ is the voltage output of the receiver 4 and $V_r$ is the voltage output of the receiver 18. The impedance of both receivers can be held to the same value Z. The ratio ($V_i/V_r$) will vary in accordance with the frequency of the signals and the range of the submerged object from the antenna 17 as explained hereinbefore. If, as in this receiver, the signals are separated into discrete frequencies then the range is the only variable to be determined by the ratios. Different values of ranges can be calculated in accordance with the equations referred to above, and used to calibrate meters 19, 20 and 21 to which are applied the outputs of voltage dividers 14, 15 and 16. The range calibrations are the same for all the meters, so that at all the frequencies shown $f_1$, $f_2$ and $f_3$ the range indications will be the same. The three meters function as a check, one on the other, and if desired the three readings can be averaged. A greater accuracy of range detection can be had by utilizing more frequencies and therefore more ratios.

Figure 23:
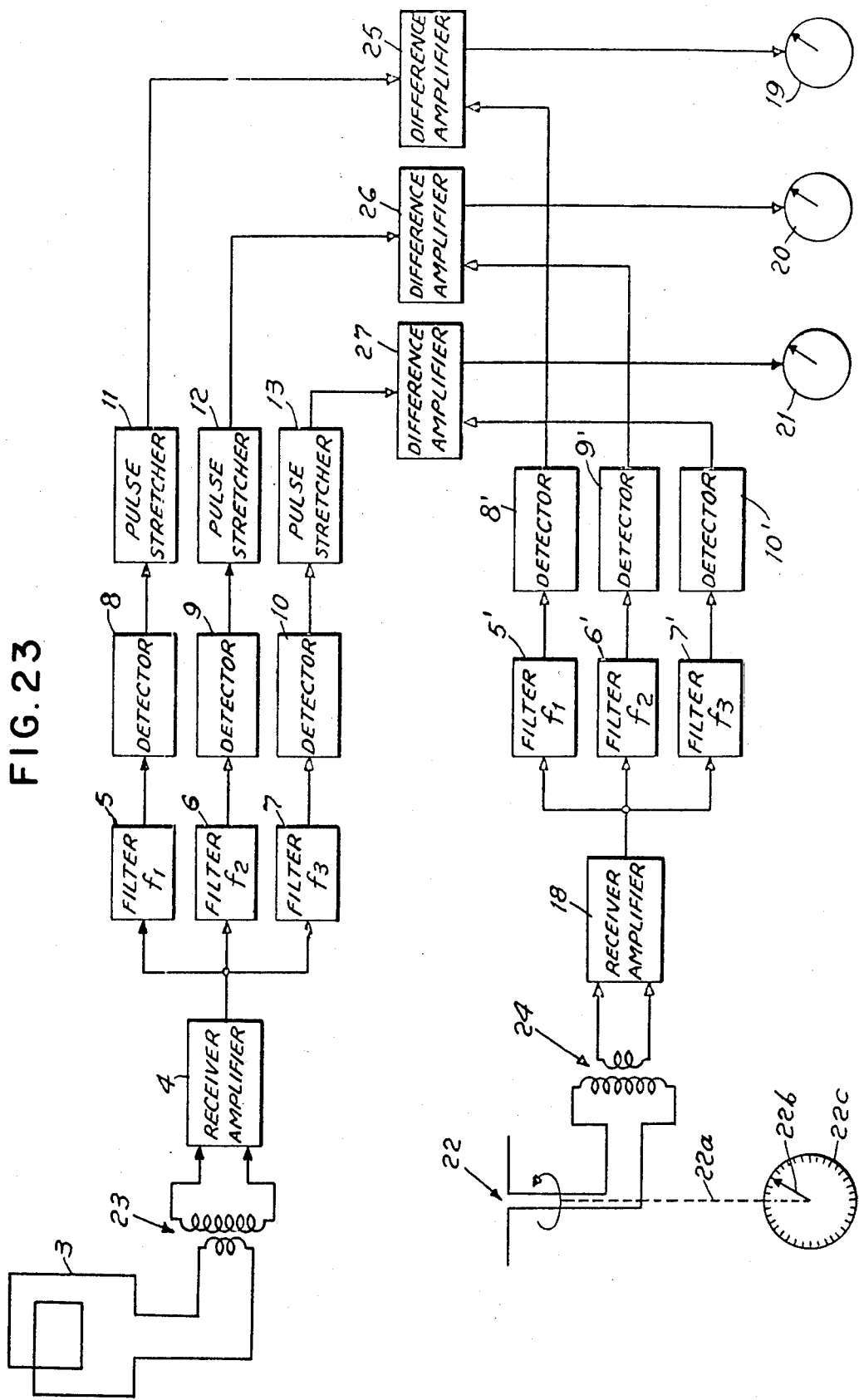
FIG. 23 is a block diagram of another embodiment of the detection system.

Referring to FIG. 23, a second embodiment of this invention utilizes the vertically polarized loop antenna 3 for reception of the incident wave radiation and a horizontally polarized dipole antenna 22 to pick up the reflected waves. The dipole antenna 22 is rotated in a horizontal plane about a shaft 22a to provide directivity. A painter 22b is connected to the end of the shaft 22a and is rotated about an azimuth scale 22c to provide the azimuth indication. The output of the loop antenna 3 is coupled to a step up transformer 23 and the output of the dipole antenna 22 is coupled to a step down transformer 24 to compensate for the lower loop impedance and provide an impedance match. The receiver and circuit elements are the same in this embodiment as in that of FIG. 23 except that instead of voltage dividers 14, 15 and 16, there are provided difference amplifiers 25, 26 and 27. In this case there is derived the difference $V_i - V_r$, specific for each frequency and varying only as the range varies. In addition to range, conventional calibration devices, such as azimuth scales; may be provided in conjunction with directional antenna 22 to indicate the azimuth of the submerged object.

It is obvious that by combining the detection system disclosed in the deRosa application, Ser. No. 829,181, with the detection system disclosed herein, that the presence, depth and range of the submerged object will be immediately ascertained.

It is also to be understood that this system will operate equally well with a combination of vertically polarized dipole for the incident wave reception and a horizontally polarized dipole for the reflected wave reception.

While we have described above the principles of our invention in connection with specific apparatus, it is to be clearly understood that this description is made only by way of example and not as a limitation to the scope of our invention as set forth in the objects thereof and in the accompanying claims.

We claim:

1. In a system for detecting the location of an object submerged in a medium having radiation transmission characteristics substantially different from that of the atmosphere; means adapted to receive an incident radiation of a source of electromagnetic energy propagated in a first electric field, means adapted to receive the reflection of said electromagnetic energy propagated in a different electric field caused by the presence of an object submerged in said medium, and means to compare the field strength of the incident radiation with the field strength of the reflected radiation to determine the relation therebetween, said relation being a measure corresponding substantially to the range of said object.

2. In a system for detecting the location of an object submerged in a medium having transmission characteristics substantially different from that of the atmosphere by means of radiated electromagnetic energy containing a multiplicity of frequencies; means to receive an incident radiation of said electromagnetic energy propagated in a first electric field and the reflection of said radiation propagated in a different electric field caused by the presence of a submerged object within the range of said system, said reflection containing some of the frequencies of said incident radiation, means to derive from said received incident radiation and said reflected radiation frequencies common to both, and means to compare said radiations of common frequencies to determine the relative field strength thereof, and thereby obtain a measure corresponding substantially to the range of the submerged object.

3. In a system for detecting the location of an object submerged in a medium having transmission characteristics substantially different from that of the atmosphere by means of radiated electromagnetic energy containing a multiplicity of frequencies and regardless of the source of said energy propagated in a first electric field; means to receive an incident radiation propagated in a different electric field of said electromagnetic energy and the reflection of said radiation caused by the presence of a submerged object within the range of said system, said reflection containing some of the frequencies of said incident radiation, means to filter from said received incident radiation and said reflected radiation all frequencies outside of a given range of frequencies and means to compare the field strength of said filtered reflected radiation with the field strength of said incident radiation to determine the relation therebetween, and thereby obtain a measure corresponding substantially to the range of the submerged object.

4. In a system for detecting the location of an object submerged in a medium having transmission characteristics substantially different from that of the atmosphere by means of radiated electromagnetic energy containing a multiplicity of frequencies and regardless of the source of said energy; means to receive an incident radiation of said electromagnetic energy and the reflection of said radiation caused by the presence of a submerged object within the range of said system, said reflection containing some of the frequencies of said incident radiation, means to filter from the said received incident radiation and said reflected radiation all frequencies outside of a given frequency, means to delay said filtered incident radiation and means to compare the field strength of said delayed incident radiation with the field strength of said filtered reflected radiation to determine the relation therebetween, and thereby obtain a measure corresponding substantially to the range of the submerged object.

5. In a system for detecting the location of an object submerged in a medium having transmission characteristics substantially different from that of the atmosphere by means of radiated electromagnetic energy containing a multiplicity of signals of different frequencies and regardless of the source of said energy; means to receive an incident radiation of said electromagnetic energy and the reflection of said radiation by the presence of a submerged object within the range of said system, said reflected radiation containing some of the frequencies of said incident radiation, means to derive from said received incident radiation and said reflected radiation in frequency common to both, means to extend the duration of said received incident radiation, means to compare the field strength of said filtered incident radiation with the field strength of said filtered reflected radiation to determine the relation therebetween, and thereby obtain a measure corresponding substantially to the range of the submerged object.

6. In a system for detecting the location of an object submerged in a medium having transmission characteristics substantially different than the atmosphere by means of radiated electromagnetic energy containing a multiplicity of signals of different frequencies and regardless of the source of said energy; means to receive an incident radiation of said energy and the reflections of said radiation caused by the presence of a submerged object within the range of said system, said reflected radiation containing some of the frequencies of said incident radiation, means to derive from said incident radiation and said reflected radiation a signal frequency common to both, means to extend the duration of said filtered incident radiation of each said frequency to be coincident with said filtered reflected radiation of the corresponding frequency, means to compare the field strength of each said signal frequency of said extended incident radiation with the field strength of the corresponding signal frequency of said reflected radiation to determine the relation therebetween, said relation indicating the range of said submerged object.

7. In a system for detecting the location of an object submerged in a medium having transmission characteristics substantially different from that of the atmosphere by means of radiated electromagnetic energy containing a multiplicity of signals of different frequencies and regardless of the source of said energy; means to receive an incident radiation of said energy and the reflections of said radiation caused by the presence of a submerged object within the range of said system, said reflected radiation containing some of the frequencies of said incident radiation, means to derive from said incident radiation and said reflected radiation a plurality of discrete frequency signals common to both, means to extend the duration of each derived discrete frequency signal of said incident radiation for a time substantially equal to the time difference to the velocity of propagation of said frequency signal in said medium as compared to the atmosphere, and means to compare the field strength of said extended signals of each said discrete frequency of said incident radiation with the field strength of the corresponding frequency signal of said reflected radiation to determine the relation therebetween, said relation indicating substantially the range of said submerged object.

8. In a system for detecting the location of an object submerged in a medium having transmission characteristics substantially different from that of the atmosphere by means of radiated electromagnetic energy containing a multiplicity of signals of different frequencies and regardless of the source of said energy; first antenna means polarized in a first plane to receive an incident radiation of said energy, means to detect said incident radiation and to derive therefrom a plurality of discrete frequency signals, second antenna means polarized in a plane orthogonal to said first plane to receive the reflections of said radiation caused by the presence of a submerged object within the range of said system, said reflected radiation containing some of the frequencies of said incident radiation, means to detect said reflected radiation and to derive therefrom a plurality of discrete signals corresponding to said discrete signals of said incident radiation, means to extend the duration of each discrete frequency signal of said incident radiation for a time substantially equal to the time difference of the velocity of propagation of said frequency signal in said medium as compared with the velocity of propagation thereof in the atmosphere, means to compare the field strength of said signals of each said discrete frequency of said incident radiation with the field strength of the corresponding frequency signal of said reflected radiation to determine the relation therebetween, said relation indicating substantially the range of said object.

9. In a system for detecting the location of a submerged object according to claim 8 wherein said first and second antenna means are loop antennas.

10. In a system for detecting the location of a submerged object according to claim 8 wherein said first antenna means is a loop antenna and said second antenna means is a dipole antenna.

11. In a system for detecting the location of a submerged object according to claim 10 further including means to rotate said dipole antenna in the plane of polarization of said dipole antenna.

12. In a system for detecting the location of a submerged object according to claim 8 wherein said means to determine the relative field strength of said incident radiation and said reflected radiation comprise a plurality of voltage dividers, means coupling the outputs of each said incident radiation detectors and said reflected radiation detectors having corresponding frequencies to a common one of said voltage dividers, whereby the output of each said voltage dividers is a voltage indicating the ratio of the field strength of said incident radiation of that frequency to the field strength of the reflected radiation of the corresponding frequency, a plurality of range indicators, and means coupling the outputs of each said voltage dividers to a corresponding range indicator, each of said range indicators indicating the distance of said submerged object from said receiver.

13. In a system for detecting the location of a submerged object according to claim 8 wherein said means to determine the relative field strength of said incident radiation and said reflected radiation comprise a plurality of difference amplifiers, means coupling the outputs of each said incident radiation detectors and said reflected radiation detectors having corresponding frequencies to a common one of said difference amplifiers, whereby the output of each said difference dividers is a voltage indicating the difference between the field strength of said incident radiation of the frequency and the field strength of the reflected radiation of the corresponding frequency, a plurality of range indicators, and means coupling the outputs of each said difference amplifiers to a corresponding range indicator, each of said range indicators indicating the distance of said submerged object from said receiver.

14. In a system for detecting the location of an object submerged in a medium having transmission characteristics substantially different from that of the atmosphere by means of radiated electromagnetic energy containing a multiplicity of signals of different frequencies and regardless of the source of said energy; first antenna means polarized in a first plane to receive an incident radiation of said energy, means to detect said incident radiation and to derive therefrom a plurality of discrete frequency signals, second antenna means polarized in a plane orthogonal to said first plane to receive the reflections of said radiation caused by the presence of a submerged object within the range of said system, said reflected radiation containing some of the frequencies of said incident radiation, means to detect said reflected radiation and to derive therefrom a plurality of discrete signals corresponding to said discrete signal of said incident radiation, means to extend the duration of each discrete frequency signal of said incident radiation for a time substantially equal to the time difference of the velocity of propagation of said frequency signal in said medium as compared with the velocity of propagation thereof in the atmosphere, means to compare the field strength of said signals of each said discrete frequency of said incident radiation with the field strength of the corresponding frequency signal of said reflected radiation of determine the relation therebetween said relation indicating substantially the range of said object, and means to rotate said second antenna means about an axis perpendicular to said plane of polarization of said second antenna means to determine the bearing of said submerged object.

15. In a system for detecting the location of a submerged object according to claim 14 wherein said first antenna means is a loop antenna and said second antenna means comprises a pair of spaced apart loop antennas.

16. In a system for detecting the location of a submerged object according to claim 14 wherein said first antenna means is a loop antenna and second second antenna means is a dipole antenna.

* * * * *